UNITED STATES PATENT OFFICE.

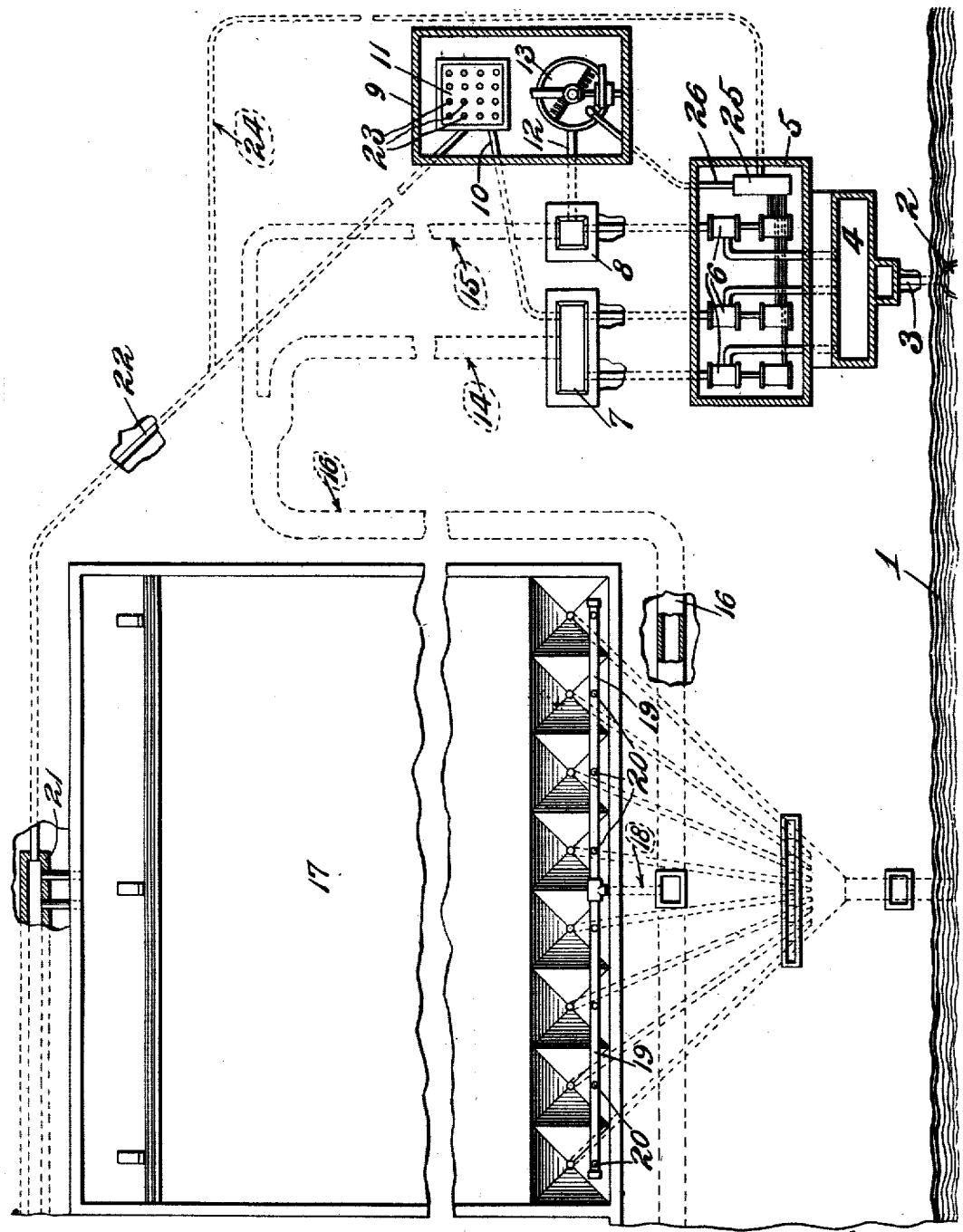

JOHN F. WIXFORD, OF ST. LOUIS, MISSOURI.

SYSTEM OF WATER PURIFICATION.

No. 814,180.   Specification of Letters Patent.   Patented March 6, 1906.

Application filed November 18, 1905. Serial No. 287,946.

*To all whom it may concern:*

Be it known that I, JOHN F. WIXFORD, a citizen of the United States, and a resident of the city of St. Louis and State of Missouri, have invented a new and useful System of Water Purification, of which the following is a specification.

My invention relates to systems of water purification, and has for its principal objects to divide the stream of water to be treated into a plurality of streams which are separately treated and thoroughly mixed with the chemicals to react on the water and which are subsequently united before reaching the settling-basin, to divide the stream of water to be treated into streams of unequal size, to treat the larger stream with the chemical which it is desired shall react on the raw water first and the smaller stream with the chemical which it is desired shall subsequently react on the water and to subsequently unite said streams and thoroughly mix the same before reaching the settling-basin, to divide the stream of water to be treated into two streams which are separately treated and thoroughly mixed with the chemicals to react on the water and to subsequently unite the streams and thoroughly mix them for a period sufficiently long to permit the slower reactions to be substantially completed before the united stream reaches the settling-basin, and other objects hereinafter more fully appearing.

My invention consists in the arrangements and combinations hereinafter described and claimed.

The accompanying drawing shows a plan view of one specific arrangement of my system, the details being shown conventionally.

The present system is intended to be used in carrying out a process of chemical purification of water, and especially a process in which the water is treated with large quantities of lime or hydrate of lime in the presence of a coagulant—such, for example, as ferrous sulfate or ferrous fluorid. To illustrate the system and its use, it will be described as applied to my process of water purification described and claimed in Letters Patent No. 807,008, granted to me December 12, 1905.

In carrying out the process of water purification mentioned ferrous sulfate in solution is continuously added to the raw water. The reaction with the raw water being complete, hydrate of lime is added to the water. It is added in large quantities, and it is therefore desirable to prepare it in the form of milk of lime. The milk of lime is not, however, the form of the hydrate which reacts on the water and the matter therein most rapidly, for the hydrate of lime in suspension must first be dissolved in the water, the chemical reactions taking place subsequently. It is impracticable to prepare the solution of the hydrate from the purified water, as it would involve the use of such quantities as to make the process expensive. The present system overcomes these difficulties, while retaining all the advantages of the process and the convenience of preparing the lime in the form of milk of lime.

The plant used as an illustration of the system is shown near a stream 1, which is the source of water-supply in this particular instance. An intake-tower 2 is located in the stream, and a conduit 3 leads to the wet well 4 of the pump-house 5. Pumps 6 draw the water from the wet well 4 and force it to delivery-wells. Certain of said pumps deliver water to a delivery-well 7, while another delivers it to a delivery-well 8. The pipes or conduits from the pumps to the delivery-wells open into the latter at a considerable height above the normal level of the water therein, and hence the falling of the water produces a violent agitation. A coagulating-house 9, in which the reagents are prepared, is located near the delivery-wells. The outlet-pipe 10 of a tank 11, in which the solution of ferrous sulfate is prepared, leads to the delivery-well 7 and empties thereinto. The outlet-pipe 12 of a tank or digester 13, in which the milk of lime is prepared, leads to the delivery-well 8 and empties thereinto. The violent agitation in the wells thoroughly mixes the reagents with the water. Conduits 14 15 lead from the wells 7 8, respectively, and are of such length that it will take several minutes for the water to flow through them, and the reagents will have time to complete their reactions before reaching the ends thereof. The ferrous sulfate reacts on the bicarbonates in the water, and the ferrous bicarbonate is formed. The stream flowing through the conduit 14 is by far the larger of the two. The stream flowing through the conduit 15 is just large enough to dissolve the hydrate of lime which was added as milk of lime. Of course the lime reacts on the matter in the water; but the reactions may be neglected on account of the small size of the stream. The two conduits 14 15 empty into a single conduit 16, and here the two streams unite. The stream coming through the conduit 15, although a portion of the stream of water to be purified, is substantially a stream of lime-water or a solution of hydrate of lime and reacts on the larger stream as such.

The reactions which are described in the specification above referred to take place in the conduit 16, which is long enough to give the slower reactions time to take place before the water reaches the basin and requiring several minutes. The agitation of the water in flowing through this conduit is sufficient to thoroughly mix the streams and insure treatment of all the water. The conduit 16 extends along one end of a series of settling-basins 17, of which one is shown in the accompanying drawing. An intake-pipe 18 leads from the conduit into the basin. Lateral branch pipes 19 extend from said intake-pipe 18 along the end of the basin and are provided with upwardly-extending spouts or pipes, through which the water is discharged in upwardly-directed streams. The upper ends of said pipes 20 are considerably below the normal level of the water in the basin. The velocity of the inflowing streams is dissipated partly by gravity and partly by the resistance of the water above. Hence the water in the basin is agitated over a very small area, and the water entering the basin soon becomes quiet. This is the condition desired for rapid coagulation and sedimentation.

The settling-basin shown is arranged for cleaning without emptying. This basin is described and claimed in my application filed May 1, 1905, Serial No. 258,228, to which reference is made for a full description.

The settling-basin empties into a clear-water or discharge conduit 21, which runs along its discharge end. This conduit leads to the distributing main or conduit.

A pipe 22 leads from the clear-water conduit 20 to the iron tank 11. The water is admitted into the tank through a plurality of nozzles 23. The discharge or outlet pipe 10 opens into the tank near the top. The ferrous-sulfate crystals are introduced into the tank in measured quantities at measured intervals. The solution of ferrous sulfate is prepared by the process described and claimed in Letters Patent No. 806,945, granted to me December 12, 1905.

A branch pipe 24 leads from said pipe 22 to a condenser 25 in the pump-house. The water is heated in the condenser to about 125° Fahrenheit and is led by a pipe 26 to the lime-tank or digester 13. The discharge or outlet pipe 12 of the lime-tank opens thereinto near the top thereof. The milk of lime is continuously prepared by the process described and claimed in Letters Patent No. 806,946, granted to me December 12, 1905.

The sizes of the streams into which the total quantity of water to be purified is divided may be varied in proportion to the amount of lime to be added, if desired. However, it will probably be more practicable to arrange the plant for a smaller stream sufficiently large to dissolve all the lime that will be added for any condition of the water and a larger stream consisting of the remainder of the total water-supply and then to maintain the proportion. What these sizes will be will depend upon the amount of lime necessary to treat the particular water-supply in its worst condition. For example, in a plant to treat the Mississippi river water the smaller stream should consist of one-twelfth of the total volume of water and the larger stream of eleven-twelfths.

Obviously the system is capable of modification within the scope of my invention, and therefore I do not wish to be limited to the exact construction shown and described.

What I claim as my invention, and desire to secure by Letters Patent, is—

1. A system of water purification comprising conduits leading from a source of water-supply, means to introduce reagents into said conduits, a settling-basin, and a conduit emptying into said basin and into which both said conduits empty.

2. A system of water purification comprising a settling-basin, a conduit emptying into said basin, conduits connected with a source of water-supply and said first-mentioned conduit and means to introduce reagents into said last-mentioned conduits at such points that the reagents will take several minutes to reach said first-mentioned conduit.

3. A system of water purification comprising a settling-basin, a conduit emptying into said basin, conduits connected with a source of water-supply and connected to said first-mentioned conduit at a point distant from the point at which it empties into said basin far enough for the reagents to take several minutes to reach said basin.

4. A system of water purification comprising conduits connected with a source of water-supply one of said conduits carrying a smaller stream than the other, means to introduce hydrate of lime into the conduit carrying the smaller stream and means to introduce a coagulant into the conduit carrying the larger stream, a settling-basin and a conduit connecting said conduits and said basin.

5. A system of water purification comprising conduits connected with a source of water-supply, means to introduce hydrate of lime into one of said conduits, said conduit carrying a stream of water of substantially the volume necessary to dissolve the hydrate of lime introduced, means to introduce a coagulant into the other of said conduits, a settling-basin and a conduit connecting said conduits and said basin.

6. A system of water purification comprising conduits connected with a source of water-supply, means to introduce hydrate of lime into one of said conduits, means to introduce a coagulant into the other of said conduits, a settling-basin and a conduit connecting said conduits with said basin, said last-mentioned conduit being long enough to permit the reactions to be substantially completed before the water reaches the said basin.

7. A system of water purification comprising delivery-wells, conduits connected with a source of water-supply and emptying into said delivery-wells above the normal level of the water therein, means to introduce reagents into said delivery-wells, a conduit leading from each of said delivery-wells, a settling-basin and a conduit connecting said settling-basin and said conduits from said delivery-wells.

In testimony whereof I have signed my name to this specification in the presence of two subscribing witnesses.

JOHN F. WIXFORD.

Witnesses:
FRED F. REISNER,
JULIA B. MEGOWN.